F. DITCHFIELD.
TIRE.
APPLICATION FILED MAY 31, 1919.
1,344,025.
Patented June 22, 1920.
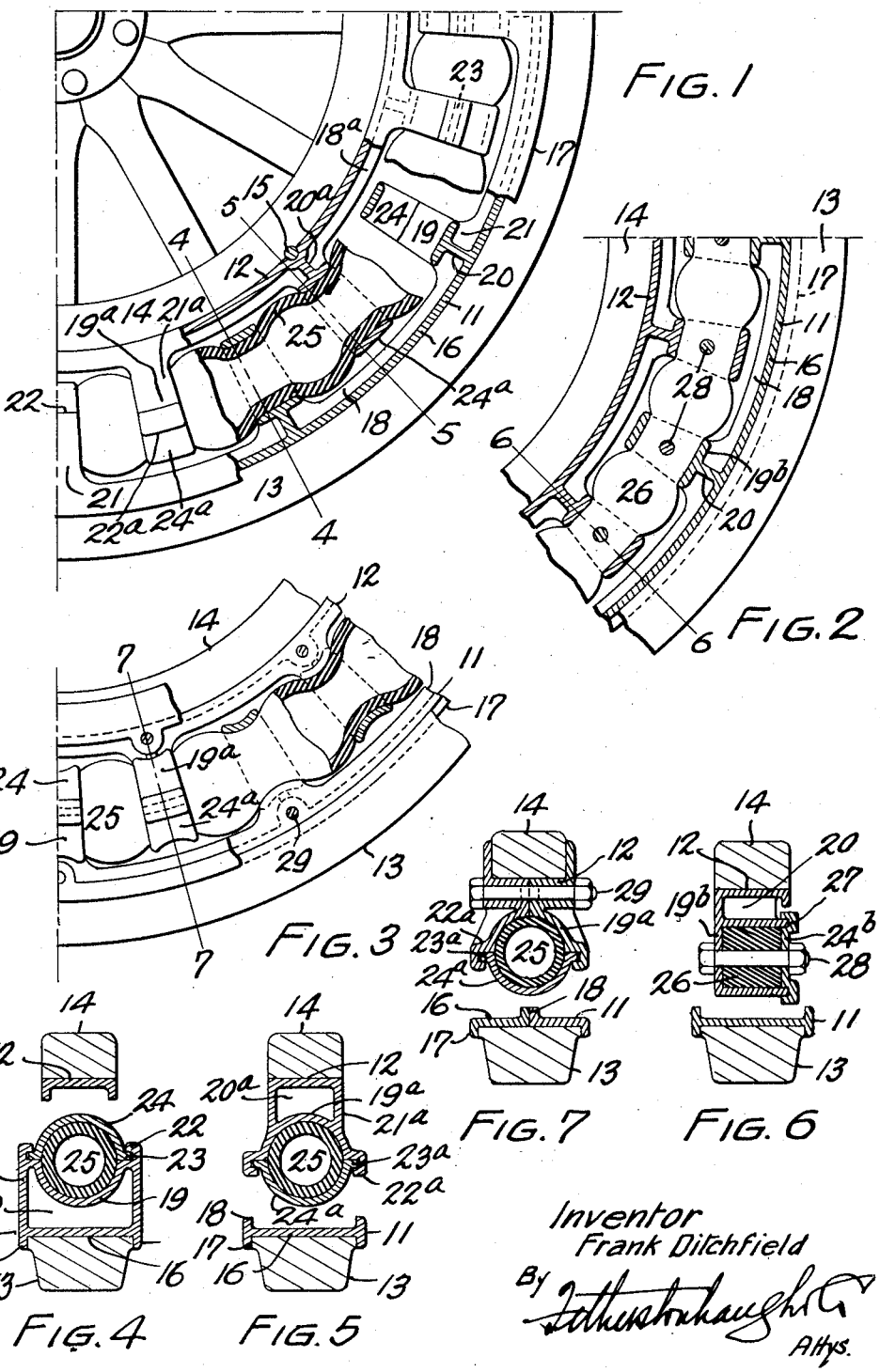
Inventor
Frank Ditchfield

UNITED STATES PATENT OFFICE.

FRANK DITCHFIELD, OF MONTREAL, QUEBEC, CANADA.

TIRE.

1,344,025.  Specification of Letters Patent.  Patented June 22, 1920.

Application filed May 31, 1919. Serial No. 300,908.

*To all whom it may concern:*

Be it known that I, FRANK DITCHFIELD, a subject of the King of Great Britain, and resident of the city of Montreal, in the Province of Quebec and Dominion of Canada, have invented certain new and useful Improvements in Tires, of which the following is a full, clear, and exact description.

This invention relates to improvements in tires and the object of the invention is to provide a tire so arranged with relation to the wheel carrying it that the entire load on the wheel is uniformly distributed throughout the tire, producing a plurality of local actions equidistant throughout the circumference of the tire.

A further object is to provide a pneumatic tire in which the air filled tube is sufficiently removed from the tread and sufficiently protected to insure it against puncture.

Another object is to provide a pneumatic tire so constructed that a given load may be supported with very much lower air pressure in the tire than is necessary in tires of ordinary construction to support the same load.

A further object is to provide a tire of inexpensive and durable construction in which the pneumatic tube may be easily and quickly exchanged when necessary.

The invention consists briefly in providing inner and outer rigid rims carrying between them radially disposed tube encircling members, the members carried by the outer rim being alternated with those carried by the inner rim. A pneumatic cushion is threaded through the encircling means and extends around the tire between the inner and outer rims, so that any movement of the rims from their normal concentric position produces relative movement between adjoining encircling means and consequently local distortions of the cushions. The inner rim is designed to be attached to a wheel and the outer rim to be provided with any suitable form of tread.

In the drawings which illustrate the invention:—

Figures 1, 2 and 3 are partial elevations illustrating various forms of the invention.

Figs. 4 and 5 are sections on the lines 4—4 and 5—5 respectively of Fig. 1.

Fig. 6 is a section on the line 6—6, Fig. 2.

Fig. 7 is a section on the line 7—7, Fig. 3.

Referring more particularly to the drawings, 11 and 12 designate the outer and inner rims respectively of a tire, the outer being adapted to carrying any suitable tread 13 and the inner being adapted for attachment to the felly 14 of a wheel by any suitable means such as the bolts 15. The outer rim comprises a plate 16 having at the edges outwardly projecting and tread retaining flanges 17 and inwardly projecting stiffening flanges 18. At suitable and regular intervals, semicircular cushion supports 19 are connected to the plate 16 by means of transverse supporting webs 20 and extensions 21 of the flanges 18. At the extremities of the supports, hook-shaped lugs 22 are provided adapted to receive lips 23 formed at the extremities of semicircular cap members 24. The inner rim 12 is provided at its edges with outwardly projecting flanges 18$^a$ and with capped cushion supports, formed exactly similar to the supports of the outer rim and designated by similar numerals bearing the distinguishing letter "a." It will be noted that the cushion supports project inwardly from the outer rim and outwardly from the inner rim and that in the forms shown in Figs. 1 and 3 these supports with their caps are annular. The adjacent edges of these supports are radial with respect to the center of the tire, as shown in Figs. 1 and 3, but may be parallel as shown in Fig. 2.

An endless tube 25 of suitable cross section is placed between the inner and outer rims and is encircled by the capped supports of the rims. This tube is inserted or removed by removing the caps 24 and 24$^a$ from the supports 19 and 19$^a$. The caps are removed from the supports carrying them by moving the caps in directions substantially tangential to the tire until the lips 23, 23$^a$ thereof disengage or engage the hooks 22 or 22$^a$ of the supports. When the tube and support caps are in place, the tube is inflated and expands within the encircling means, thus holding the caps against movement necessary to disengage them from the supports. The tube when inflated will expand between the supports, as clearly shown in Figs. 1 and 3. The tube may be formed of uniform diameter throughout or may be molded with portions of increased diameter at suitable intervals. It will be noted that the encircling supports of the cushion tube are cylindrical, as shown in Fig. 1, and of approximately double frusto-conical form as shown in Fig. 3. This latter form is merely an enlargement or exaggeration of the rounded edges of the supports shown in Fig. 1 and is for the purpose of relieving the cushion as much as possible from localized abrasion.

In Fig. 2 the cushion member 26 is solid and reliance is placed on the resiliency and elasticity of the material to furnish resiliency to the tire. The cushion is conveniently square in cross section necessitating different shaping of the supports and caps. For convenience, the supports 19$^b$ each embrace three sides of the cushion and the caps 24$^b$ are all located at one side of the wheel. These caps are grooved at their edges, as at 27, to receive the free edges of the supports and hold the support walls against movement toward or away from one another. The cushion 26 is preferably composed of highly elastic rubber of uniform cross section and is slightly compressed in inserting it in the supports. When the caps are tightened down by means of their attaching bolts and nuts 28, the cushion is further compressed, so that it assumes the form shown in Fig. 2 and is under compression in the circumferential direction of the tire between the supports.

In Figs. 1 and 2 the rims shown are best produced by casting, while in Fig. 3 a form of rim is shown which may be produced by pressing. Each rim is made up of two exactly similar parts secured together around the tread or felly by means of bolts 29. In this form the supports are carried in the central plane of the tire instead of by the flange extensions 21.

The operation of the device is exceedingly simple and a tire with pneumatic cushion will be first considered. When inflated, the tube bulges out between its encircling supports and holds the rims concentric. It will be seen that the cushion comprises what may be termed alternate supported and unsupported lengths, the supported lengths being connected alternately with the inner and outer rims, while the expansive pressure of the air in the tube is exerted in the unsupported portions to bulge the same and hold the encircling supports equidistant and therefore hold the rims concentric. When the tire is under load the rims are moved into eccentric relation, and this produces relative movement of the encircling supports and consequent flattening of the unsupported bulged portions of the cushion. This flattening reduces the volume of the cushion in exactly the same way that flattening of the ordinary tire in contact with the road surface reduces its volume and brings the elastic force of the compressed air into play. While the flattening of the bulged or unsupported cushion portions occurs in a different manner in different parts of the wheel, the reduction in volume of the bulged portions is nevertheless approximately equal throughout the tire. Any inequality in volume reduction is compensated for by the air, so that all parts of the tube surface are under the same pressure and all parts therefore support exactly the same load. Owing to the fact that the distortion of the tube takes place at a number of points instead of at a single point as in the ordinary tire, it is clear that a much greater reduction in volume occurs, so that a lower pressure in the tube will produce the same cushioning effect as a higher pressure in an ordinary pneumatic tube.

The expansion of the tube within and between the encircling supports holds the support caps securely in place. The cushion is protected from contact with the road surface or objects lying thereon and is thereby guarded against abrasion and puncture. The distance of the tread surface from the tube is sufficient to enable the wheel to run in mud of ordinary depth without the cushion tube dipping into the mud. The tube fits so tightly within its supports that very little, if any, mud can work in between them to cause abrasion of the tube and, even if grit does work in at this point, the movement between the tube and its supports is so little that the abrasive effect is for all practical purposes *nil*. Between the supports the tube is out of contact with the rims and is therefore not subject to abrasion. It will be noted in the cross sectional views that the outer rim projects beyond the cushion, so that when driving against a curb or in a deep rut the cushion is protected from scraping.

The action of the solid cushion shown in Figs. 2 and 6 is similar to the action of the pneumatic cushion, except that the equalizing effect of the air is lacking. In effect, however, the unsupported portions of the solid cushion will sustain substantially equal loads. In any event, the inequality of loading is only momentary, owing to the rolling of the wheel, which will constantly shift the manner or direction of loading in the unsupported sections.

Having thus described my invention, what I claim is:—

1. In a tire, inner and outer concentric rims, an annular cushion located between and concentric with said rims, and cushion supporting members connected to the rims, said cushion being arranged to exert an expansive pressure between the supports and hold the supports normally equidistant and the rims normally concentric.

2. In a tire, inner and outer concentric rims, an annular cushion located between and concentric with said rims, and supporting members encircling the cushion and connected to the rims, said cushion being in displacement between adjacent supports.

3. In a tire, inner and outer concentric rims, an annular cushion located between and concentric with said rims, and supporting members encircling the cushion and connected to the rims, the cushion being compressed within the supports and thereby expanded to a larger diameter between the supports.

4. In a tire, inner and outer concentric rims, an annular cushion located between and concentric with said rims, and supporting members for the cushion connected to the rims each comprising a member secured to one of the rims and a cap having slidable engagement therewith and held against disengagement by the cushion.

5. In a tire, inner and outer concentric rims, an annular cushion located between and concentric with said rims, and supporting members for the cushion connected to the rims each comprising a part fixed to a rim and partly embracing the cushion, hooks on said part, a cap member partly embracing the cushion and slidably engageable with said hooks, said cap member being held in engagement with the hooks by expansive pressure of the cushion.

6. In a tire, inner and outer concentric rims, an annular cushion located between and concentric with said rims, and supporting members for the cushion connected to the rims each comprising a part fixed to a rim and a cap engageable therewith and disengageable therefrom by movement in substantially the tangential direction of the tire.

7. In a tire, inner and outer concentric rims, an annular cushion therebetween concentric therewith, and supports for said cushion at intervals connected alternately to the inner and outer rims, said cushion being compressed by the supports and thereby bulged to larger diameter between the supports and operating to resist independent revolution and eccentric displacement of the rims.

In witness whereof I have hereunto set my hand.

FRANK DITCHFIELD.